(12) United States Patent
Taniwaki et al.

(10) Patent No.: US 11,575,135 B2
(45) Date of Patent: Feb. 7, 2023

(54) ELECTRODE CATALYST LAYER, MEMBRANE ELECTRODE ASSEMBLY, AND POLYMER ELECTROLYTE FUEL CELL

(71) Applicant: TOPPAN PRINTING CO., LTD., Tokyo (JP)

(72) Inventors: Kazuma Taniwaki, Tokyo (JP); Takahiro Matsuura, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 100 days.

(21) Appl. No.: 17/029,701

(22) Filed: Sep. 23, 2020

(65) Prior Publication Data

US 2021/0013520 A1 Jan. 14, 2021

Related U.S. Application Data

(63) Continuation of application No. PCT/JP2019/014195, filed on Mar. 29, 2019.

(30) Foreign Application Priority Data

Mar. 30, 2018 (JP) .............................. JP2018-069986

(51) Int. Cl.
*H01M 4/90* (2006.01)
*H01M 8/1004* (2016.01)
(Continued)

(52) U.S. Cl.
CPC ....... *H01M 4/9075* (2013.01); *H01M 8/1004* (2013.01); *H01M 8/1032* (2013.01);
(Continued)

(58) Field of Classification Search
CPC ............. H01M 4/9075; H01M 8/1004; H01M 8/1032; H01M 2008/1095;
(Continued)

(56) References Cited

U.S. PATENT DOCUMENTS

| 2005/0244696 A1* | 11/2005 | Kuromatsu ....... H01M 8/04197 |
| | | 429/535 |
| 2006/0093893 A1 | 5/2006 | Matsuo et al. |
| 2007/0231672 A1 | 10/2007 | Tanaka et al. |

FOREIGN PATENT DOCUMENTS

| JP | 2010-251140 A | 11/2010 |
| JP | 2012-243693 A | 12/2012 |

(Continued)

OTHER PUBLICATIONS

Partial Supplementary European Search Report dated Apr. 29, 2021 for corresponding European Patent Application No. 19777686.7.

(Continued)

*Primary Examiner* — Helen Oi K Conley
(74) *Attorney, Agent, or Firm* — Foley & Lardner LLP

(57) ABSTRACT

An electrode catalyst layer includes a catalyst material, a conductive carrier that supports the catalyst material, a polymer electrolyte containing a sulfonate group, and a fibrous material. The electrode catalyst layer includes a first surface configured to be in contact with the polymer electrolyte membrane, and a second surface facing away from the first surface. A first value is obtained by dividing a peak intensity of $SO_3$ (m/z80) by a peak intensity of carbon (m/z12), and also dividing by a total thickness of the electrode catalyst layer, when the electrode catalyst layer is analyzed using time-of-flight secondary ion mass spectrometry (TOF-SIMS) at each of a plurality of positions in a thickness direction of the electrode catalyst layer from the first surface to the second surface. A rate of change of the first value with respect to a thickness of the electrode catalyst layer is −0.0020 or less.

10 Claims, 4 Drawing Sheets

(51) Int. Cl.
 H01M 8/1032 (2016.01)
 *H01M 8/10* (2016.01)
(52) U.S. Cl.
 CPC ............... *H01M 2008/1095* (2013.01); *H01M 2300/0082* (2013.01)
(58) Field of Classification Search
 CPC ........ H01M 2300/0082; H01M 4/8605; Y02E 60/50; B01J 23/42
 See application file for complete search history.

(56) References Cited

FOREIGN PATENT DOCUMENTS

| | | |
|---|---|---|
| WO | WO-02/056404 A1 | 7/2002 |
| WO | WO-2019/088042 A1 | 5/2019 |

OTHER PUBLICATIONS

International Searching Authority, "International Search Report," issued in connection with International Patent Application No. PCT/JP2019/014195, dated Jul. 2, 2019.
International Searching Authority, "Written Opinion," issued in connection with International Patent Application No. PCT/JP2019/014195, dated Jul. 2, 2019.

\* cited by examiner

ELECTRODE CATALYST LAYER, MEMBRANE ELECTRODE ASSEMBLY, AND POLYMER ELECTROLYTE FUEL CELL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/014195, filed on Mar. 29, 2019, which is based upon and claims the benefit of priority to Japanese Patent Application No. 2018-069986, filed on Mar. 30, 2018; the disclosures of which are all incorporated herein by reference in their entireties.

TECHNICAL FIELD

The present invention relates to an electrode catalyst layer, a membrane electrode assembly, and a polymer electrolyte fuel cell.

BACKGROUND

Background Art

Fuel cells generate an electric current from the chemical reaction between hydrogen and oxygen. Fuel cells have attracted attention as a clean energy source that has higher efficiency, low environmental load and reduced noise over conventional power generation systems. In particular, polymer electrolyte fuel cells, which can be used at around room temperature, are considered promising for application to in-vehicle power sources, domestic stationary power sources, and the like.

Polymer electrolyte fuel cells (PEFCs) have a structure in which a polymer electrolyte membrane is sandwiched between a fuel electrode (anode) and an oxygen electrode (cathode). The anode and the cathode each have a structure in which an electrode catalyst layer and a gas diffusion layer are laminated. The polymer electrolyte fuel cell generates power by electrochemical reactions described below when a fuel gas containing hydrogen is supplied to the fuel electrode, and an oxidant gas containing oxygen is supplied to the oxygen electrode. Note that, of the reaction formulae described below, Reaction Formula (1) is a formula indicating a reaction at the fuel electrode, and Reaction Formula (2) is a formula indicating a reaction at the oxygen electrode.

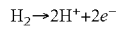  Reaction Formula (1)

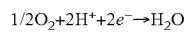  Reaction Formula (2)

An anode-side electrode catalyst layer promotes a reaction that generates protons and electrons from the fuel gas supplied to the anode-side electrode catalyst layer (Reaction Formula (1)). The protons pass through a polymer electrolyte in the anode-side electrode catalyst layer and a polymer electrolyte membrane and migrate to the cathode. The electrons pass through an external circuit and migrate to the cathode. In the cathode-side electrode catalyst layer, the protons and the electrons react with an oxidant gas to generate water (Reaction Formula (2)).

The electrode catalyst layer generally includes carbon-supported platinum and a polymer electrolyte. During power generation, the carbon contributes to electron conduction, and the polymer electrolyte contributes to proton conduction. Power generation performance of the polymer electrolyte fuel cell is significantly affected by the types of carbon and polymer electrolyte and the balance between contents of the carbon and the polymer electrolyte. On the other hand, during power generation, gas diffusivity for hydrogen, oxygen, and the like in the polymer electrolyte fuel cell and drainage for generated moisture are also important in improving power generation performance of the polymer electrolyte fuel cell. A fuel cell having high gas diffusivity and high drainage has high power generation performance.

In order to obtain high power generation performance, a membrane electrode assembly having an electrode catalyst layer in which the amount of ionomer changes in a thickness direction of the electrode catalyst layer has been proposed. The electrode catalyst layer is formed of a first layer portion, a second layer portion, and a third layer portion. The first layer portion is in contact with a polymer electrolyte membrane. The second layer portion is in contact with a gas diffusion layer. The third layer portion is sandwiched between the first layer portion and the second layer portion. Each of the first layer portion and the second layer portion has a larger amount of ionomer than the third layer portion (see, for example, PTL 1).

[Citation List] [Patent Literature] PTL 1: JP 2010-251140 A

SUMMARY OF THE INVENTION

Technical Problem

In the above-described polymer electrolyte fuel cell, the second layer portion, which is in contact with the gas diffusion layer, has a larger amount of ionomer than the third layer portion. The movement of water evaporated in the electrode catalyst layer toward the gas diffusion layer is prevented by the ionomer in the second layer portion. Accordingly, degradation of power generation performance due to reduction of the water content is prevented. On the other hand, in such a polymer electrolyte fuel cell, since drainage from the polymer electrolyte fuel cell is prevented, activity of the electrode catalyst layer is reduced, and consequently, power generation performance may be reduced.

An object of the present invention is to provide an electrode catalyst layer, a membrane electrode assembly, and a polymer electrolyte fuel cell that can improve power generation performance.

Solution to Problem

To solve the above problem, an electrode catalyst layer is configured to be bonded to a polymer electrolyte membrane in a polymer electrolyte fuel cell. The electrode catalyst layer includes a catalyst material, a conductive carrier that supports the catalyst material, a polymer electrolyte containing a sulfonate group, and a fibrous material. The electrode catalyst layer includes a first surface configured to be in contact with the polymer electrolyte membrane, and a second surface facing away from the first surface. A first value is obtained by dividing a peak intensity of $SO_3$ (m/z80) by a peak intensity of carbon (m/z12), and also dividing by a total thickness of the electrode catalyst layer, when the electrode catalyst layer is analyzed using time-of-flight secondary ion mass spectrometry (TOF-SIMS) at each of a plurality of positions in a thickness direction of the electrode catalyst layer from the first surface to the second surface. A rate of change of the first value with respect to a thickness of the electrode catalyst layer is −0.0020 or less.

To solve the above problem, an electrode catalyst layer is configured to be bonded to a polymer electrolyte membrane in a polymer electrolyte fuel cell. The electrode catalyst layer includes a catalyst material, a conductive carrier that supports the catalyst material, a polymer electrolyte containing a sulfonate group, and a fibrous material. The electrode catalyst layer includes a first surface configured to be in contact with the polymer electrolyte membrane, and a second surface facing away from the first surface. A second value is obtained by dividing a peak intensity of $HSO_4$ (m/z97) by a peak intensity of carbon (m/z12), and also dividing by a total thickness of the electrode catalyst layer, when the electrode catalyst layer is analyzed using time-of-flight secondary ion mass spectrometry (TOF-SIMS) at each of a plurality of positions in a thickness direction of the electrode catalyst layer from the first surface to the second surface. A rate of change of the second value with respect to a thickness of the electrode catalyst layer is −0.0030 or less.

To solve the above problem, an electrode catalyst layer is configured to be bonded to a polymer electrolyte membrane in a polymer electrolyte fuel cell. The electrode catalyst layer includes a catalyst material, a conductive carrier that supports the catalyst material, a polymer electrolyte containing a sulfonate group, and a fibrous material. The electrode catalyst layer includes a first surface configured to be in contact with the polymer electrolyte membrane, and a second surface facing away from the first surface. A third value is obtained by dividing a peak intensity of $SO_3$ (m/z80) by a peak intensity of carbon (m/z12), when the electrode catalyst layer is analyzed using time-of-flight secondary ion mass spectrometry (TOF-SIMS) at each of a plurality of positions in a thickness direction of the electrode catalyst layer from the first surface to the second surface. A rate of change of the third value with respect to a thickness of the electrode catalyst layer is −0.0050 or less.

To solve the above problem, an electrode catalyst layer is configured to be bonded to a polymer electrolyte membrane in a polymer electrolyte fuel cell. The electrode catalyst layer includes a catalyst material, a conductive carrier that supports the catalyst material, a polymer electrolyte containing a sulfonate group, and a fibrous material. The electrode catalyst layer includes a first surface configured to be in contact with the polymer electrolyte membrane, and a second surface facing away from the first surface. A fourth value is obtained by dividing a peak intensity of $HSO_4$ (m/z97) by a peak intensity of carbon (m/z12), when the electrode catalyst layer is analyzed using time-of-flight secondary ion mass spectrometry (TOF-SIMS) at each of a plurality of positions in a thickness direction of the electrode catalyst layer from the first surface to the second surface. A rate of change of the fourth value with respect to a thickness of the electrode catalyst layer is −0.0080 or less.

According to the above configuration, each value becomes smaller from the first surface toward the second surface, so that the amount of polymer electrolyte becomes smaller from the first surface toward the second surface. In other words, the amount of voids in the electrode catalyst layer increases from the first surface toward the second surface. This enables gas diffusivity and drainage to be improved from the first surface toward the second surface. Accordingly, power generation performance can be improved in a polymer electrolyte fuel cell having the electrode catalyst layer.

To achieve the above-described object, a membrane electrode assembly includes a polymer electrolyte membrane having two surfaces facing away from each other and the above-described electrode catalyst layer. The electrode catalyst layer is bonded to at least one of the two surfaces.

A polymer electrolyte fuel cell to solve the above problem includes the membrane electrode assembly.

DETAILED DESCRIPTION

Embodiments of the present invention will be described below with reference to the drawings. In the following description of the drawings to be referred, components identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

With reference to FIGS. 1 to 7, an embodiment of an electrode catalyst layer, a membrane electrode assembly, and a polymer electrolyte fuel cell will be described. A configuration of the membrane electrode assembly, a configuration of the electrode catalyst layer, a configuration of a single cell that constitutes the polymer electrolyte fuel cell, a formation material for the electrode catalyst layer, a method of manufacturing the membrane electrode assembly, and Examples will be described below in order.

[Configuration of Membrane Electrode Assembly]

Figure 1:
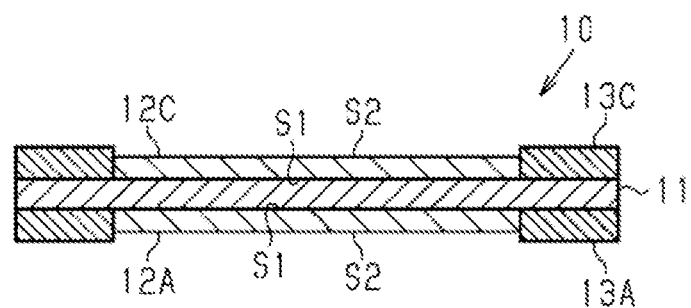
FIG. 1 is a cross-sectional view illustrating a structure of a membrane electrode assembly according to an embodiment.

With reference to FIG. 1, a configuration of the membrane electrode assembly will be described. FIG. 1 illustrates a cross-sectional structure along a thickness direction of the membrane electrode assembly.

As illustrated in FIG. 1, a membrane electrode assembly 10 includes a polymer electrolyte membrane 11, a cathode-side electrode catalyst layer 12C, and an anode-side electrode catalyst layer 12A. The polymer electrolyte membrane 11 is a solid polymer electrolyte membrane. The polymer electrolyte membrane 11 has a pair of surfaces facing away from each other. One of the surfaces is bonded to the cathode-side electrode catalyst layer 12C, and the other surface is bonded to the anode-side electrode catalyst layer 12A. The cathode-side electrode catalyst layer 12C is an electrode catalyst layer that constitutes an oxygen electrode (cathode). The anode-side electrode catalyst layer 12A is an electrode catalyst layer that constitutes a fuel electrode (anode).

In the polymer electrolyte membrane 11, of a surface to which the cathode-side electrode catalyst layer 12C is bonded, a portion other than where the cathode-side electrode catalyst layer 12C is positioned is sealed by a cathode-side gasket 13C. In the polymer electrolyte membrane 11, of a surface to which the anode-side electrode catalyst layer 12A is bonded, a portion other than where the anode-side electrode catalyst layer 12A is positioned is sealed by an anode-side gasket 13A.

The cathode-side electrode catalyst layer 12C has a pair of surfaces facing away from each other. A surface in contact with the polymer electrolyte membrane 11 is a first surface S1 and a surface facing away from the first surface is a second surface S2. The anode-side electrode catalyst layer 12A has a pair of surfaces facing away from each other. A surface in contact with the polymer electrolyte membrane 11 is a first surface S1 and a surface facing away from the first surface is a second surface S2.

[Electrode Catalyst Layer]

Figure 2:
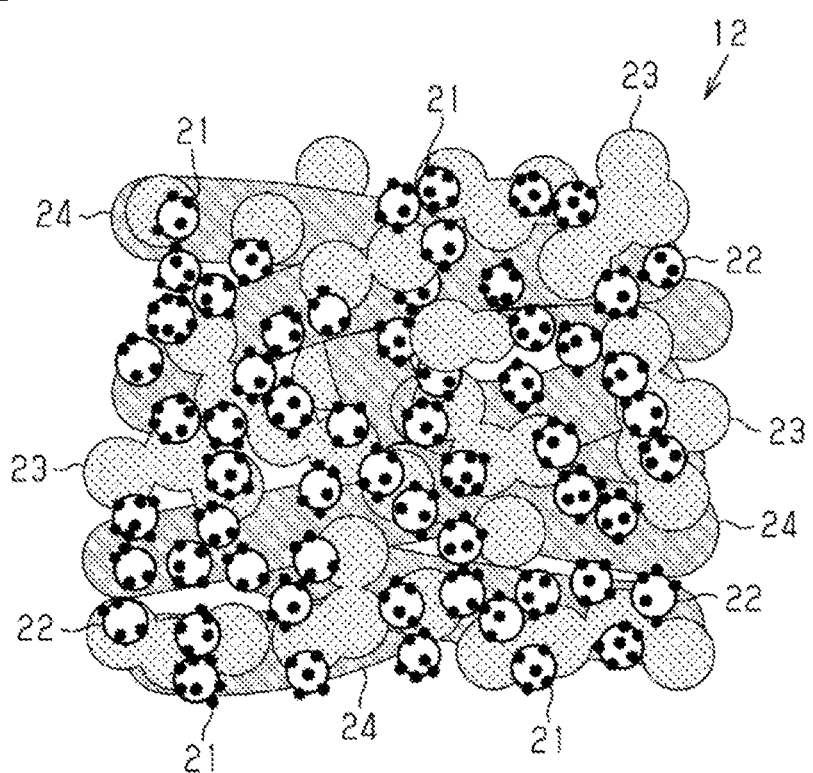
FIG. 2 is a schematic diagram illustrating a structure of an electrode catalyst layer provided in the membrane electrode assembly illustrated in FIG. 1.

With reference to FIG. 2, the electrode catalyst layer provided in the membrane electrode assembly 10 will be described in detail. Note that the electrode catalyst layer described below is applied to both the cathode-side electrode catalyst layer 12C and the anode-side electrode catalyst layer 12A, but may be applied only to either one of the cathode-side electrode catalyst layer 12C or the anode-side electrode catalyst layer 12A.

As illustrated in FIG. 2, the electrode catalyst layer 12 includes a catalyst material 21, a conductive carrier 22, a polymer electrolyte 23, and a fibrous material 24. Voids correspond to portions of the electrode catalyst layer 12 in which the catalyst material 21, the conductive carrier 22, the polymer electrolyte 23, and the fibrous material 24 are not present.

The polymer electrolyte 23 contains a sulfonate group. The polymer electrolyte 23 is preferably at least one selected from the group consisting of sulfonated polyether ketones, sulfonated polyether sulfones, sulfonated polyether ether sulfones, sulfonated polysulfides, and sulfonated polyphenylenes.

With the polymer electrolyte 23 containing at least one included in the above-described group, the distribution of the polymer electrolyte 23 in the electrode catalyst layer 12 can be determined by using the peak intensity of $SO_3$ (m/z80) and the peak intensity of $HSO_4$ (m/z97) obtained by time-of-flight secondary ion mass spectrometry (TOF-SIMS).

The characteristics contributing to the improvement of power generation performance in the electrode catalyst layer 12 are, for example, gas diffusivity of the electrode catalyst layer 12 and drainage of the electrode catalyst layer 12. In the electrode catalyst layer 12, a surface in contact with the polymer electrolyte membrane 11 is the above-described first surface S1 and a surface in contact with a gas diffusion layer is the above-described second surface S2. In order to improve gas diffusivity and drainage of the electrode catalyst layer 12, the amount of the polymer electrolyte on the second surface S2 is preferably smaller than the amount of the polymer electrolyte on the first surface S1. Additionally, in a region of the electrode catalyst layer 12, it is preferable that the shorter the distance from the second surface S2, the smaller the amount of polymer electrolyte. In other words, in the thickness direction from the first surface S1 to the second surface S2, the rate of change of the amount of polymer electrolyte is preferably negative and smaller in value. The rate of change of the amount of polymer electrolyte is preferably negative and smaller in value within a range in which a mechanical strength required for the electrode catalyst layer 12 is maintained. Specifically, the rate of change of the amount of polymer electrolyte is preferably a negative value. Additionally, the absolute value of the rate of change is preferably a larger value.

Additionally, the amount of polymer electrolytes in each region of the electrode catalyst layer 12 can be determined based on the amount of ions derived from the polymer electrolytes contained in each region of the electrode catalyst layer 12. Specifically, for example, in a case where a cross section of the electrode catalyst layer 12 along the thickness direction is analyzed using TOF-SIMS, the amount of polymer electrolytes in each region of the electrode catalyst layer 12 can be determined based on the peak intensity of ions derived from the polymer electrolytes. It can be considered that the greater the peak intensity of the ions derived from the polymer electrolyte, the greater the amount of the polymer electrolyte. In contrast, it can be considered that the smaller the peak intensity of ions derived from the polymer electrolyte, the smaller the amount of the polymer electrolyte. The larger the peak intensity of ions derived from the polymer electrolyte, the smaller the amount of voids contained in the portion in the electrode catalyst layer 12, and the smaller the peak intensity of ions derived from the polymer electrolyte, the larger the amount of voids contained in the portion in the electrode catalyst layer 12 Note that examples of the ions derived from the polymer electrolyte include $SO_3^{2-}$ ions and $HSO_4^-$ ions.

In the thickness direction of the electrode catalyst layer 12, the rate of change of the amount of ions can be determined by, for example, the following method. In the thickness direction of the electrode catalyst layer 12, the electrode catalyst layer 12 is equally divided into a plurality of portions, and the peak intensity of the ions in each portion is measured. Then, based on the peak intensity obtained from each portion, an approximate straight line is created to thereby obtain the rate of change of the amount of ions as the inclination of the approximate straight line.

From the above-described viewpoints, the electrode catalyst layer 12 satisfies at least one of Conditions 1 to 4 described below.

[Condition 1]

Under Condition 1, a first standard value as a first value is a value normalized by dividing the peak intensity of $SO_3$ (m/z80) by the peak intensity of carbon (m/z12), and also dividing by the total thickness of the electrode catalyst layer 12, when the electrode catalyst layer 12 is analyzed using TOF-SIMS at each position in the thickness direction of the electrode catalyst layer 12. The rate of change of the first standard value with respect to the thickness of the electrode catalyst layer 12 from the first surface S1 to the second surface S2 is −0.0020 or less. This enables gas diffusivity and drainage from the first surface S1 to the second surface S2 in the electrode catalyst layer 12 to be improved.

[Condition 2]

Under Condition 2, a second standard value as a second value is a value normalized by dividing the peak intensity of $HSO_4$ (m/z97) by the peak intensity of carbon (m/z12), and also dividing by the total thickness of the electrode catalyst layer 12, when the electrode catalyst layer 12 is analyzed using TOF-SIMS at each position in the thickness direction of the electrode catalyst layer 12. The rate of change of the second standard value with respect to the thickness of the electrode catalyst layer 12 from the first surface S1 to the second surface S2 is −0.0030 or less. As is the case where condition 1 is satisfied, gas diffusivity and drainage can be improved from the first surface S1 to the second surface.

[Condition 3]

Under Condition 3, a third standard value as a third value is a value normalized by dividing the peak intensity of $SO_3$ (m/z80) by the peak intensity of carbon (m/z12), when the electrode catalyst layer 12 is analyzed using TOF-SIMS at each position in the thickness direction of the electrode catalyst layer 12. The rate of change of the third standard value with respect to the thickness of the electrode catalyst layer 12 from the first surface S1 to the second surface S2 is −0.0050 or less. As is the case where condition 1 is satisfied, gas diffusivity and drainage from the first surface S1 to the second surface S2 in the electrode catalyst layer 12 can be improved.

[Condition 4]

Under Condition 4, a fourth standard value as a fourth value is a value normalized by dividing the peak intensity of $HSO_4$ (m/z97) by the peak intensity of carbon (m/z12), when the electrode catalyst layer 12 is analyzed using TOF-SIMS at each position in the thickness direction of the electrode catalyst layer 12. The rate of change of the fourth standard value with respect to the thickness from the first surface S1 to the second surface S2 is −0.0080 or less. As is the case where condition 1 is satisfied, gas diffusivity and drainage can be improved from the first surface S1 to the second surface.

As described above, in the electrode catalyst layer 12 satisfying any of Conditions 1 to 4, each standard value decreases from the first surface S1 toward the second surface S2, and thus the amount of polymer electrolytes 23 decreases from the first surface S1 toward the second surface S2. In other words, the amount of voids in the electrode catalyst layer 12 increases from the first surface toward the second surface. This enables gas diffusivity and drainage from the first surface to the second surface to be improved. Accordingly, the polymer electrolyte fuel cell having the electrode catalyst layer 12 can improve power generation performance.

The electrode catalyst layer 12 preferably satisfies, in addition to Conditions 1 to 4 described above, Conditions 5 to 8 described below.

[Condition 5]

The third standard value for the second surface S2 is 0.035 or more and 0.055 or less.

[Condition 6]

The fourth standard value for the second surface S2 is 0.083 or more and 0.103 or less.

By having each of the third value and fourth standard value in the range described above, the amount of voids on the second surface S2 can be increased to such an extent that sufficient gas diffusivity and sufficient drainage on the second surface S2 can be achieved.

[Condition 7]

A difference between the third standard value for the first surface S1 and the third standard value for the second surface S2 is 0.05 or more.

[Condition 8]

A difference between the fourth standard value for the first surface S1 and the fourth standard value for the second surface S2 is 0.08 or more.

With the difference in third standard value and the difference in fourth standard value included within the above-described ranges, dispersion of gas from the second surface S2 to the first surface S1 is likely to occur, and dispersion of generated water from the first surface S1 to the second surface S2 is likely to occur. This improves both gas diffusivity and drainage of the electrode catalyst layer 12.

Note that the thickness of the electrode catalyst layer 12 is preferably 10 μm or more and 20 μm or less. When the thickness of the electrode catalyst layer 12 is 20 μm or less, occurrence of cracking in the electrode catalyst layer 12 is prevented. Additionally, in a case where the electrode catalyst layer 12 is used in the polymer electrolyte fuel cell, diffusivity of gas and generated water, and a decrease in conductivity are prevented, and thus reduction in the output of the polymer electrolyte fuel cell is prevented. Additionally, when the thickness of the electrode catalyst layer 12 is 10 μm or more, variation in the thickness of the electrode catalyst layer 12 is less likely to occur, and an uneven distribution of the catalyst material 21 and the polymer electrolyte 23 contained in the electrode catalyst layer 12 is prevented. Note that cracking of the surface of the electrode catalyst layer 12 and uneven thickness of the electrode catalyst layer 12 are not preferable in that cracking and uneven thickness are likely to affect durability of the polymer electrolyte fuel cell in a case where the electrode catalyst layer 12 is used as a part of the polymer electrolyte fuel cell and where the polymer electrolyte fuel cell is operated over time.

[Configuration of Polymer Electrolyte Fuel Cell]

Figure 3:
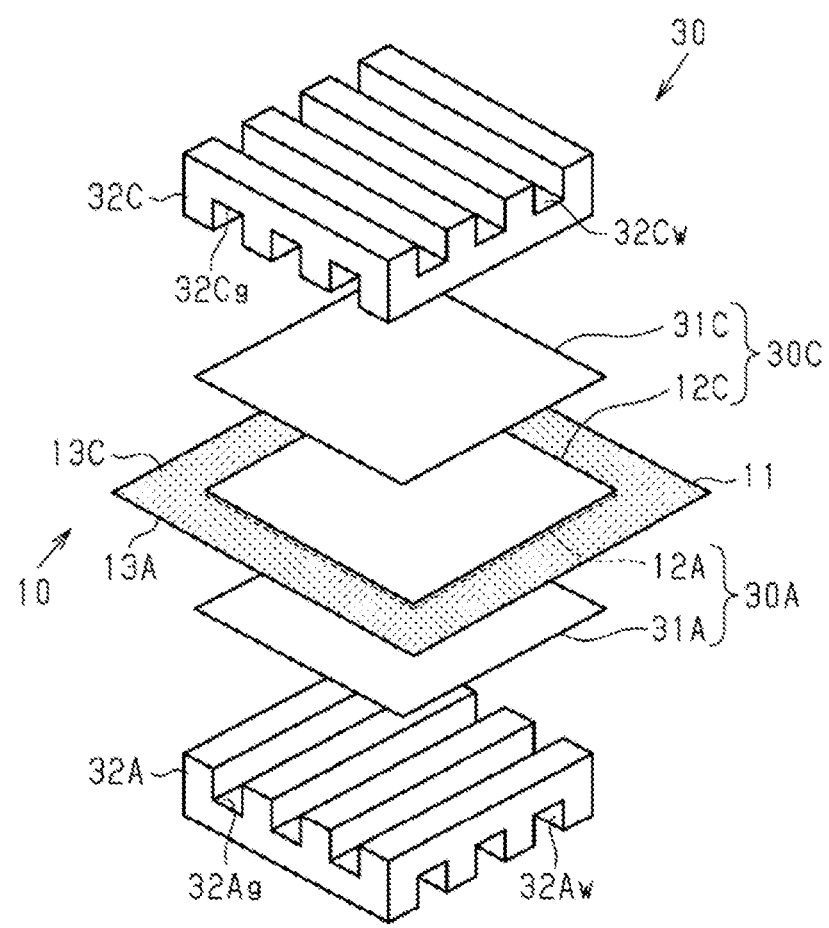
FIG. 3 is an exploded perspective view illustrating a structure of a polymer electrolyte fuel cell having the membrane electrode assembly illustrated in FIG. 1.
Figure 4:
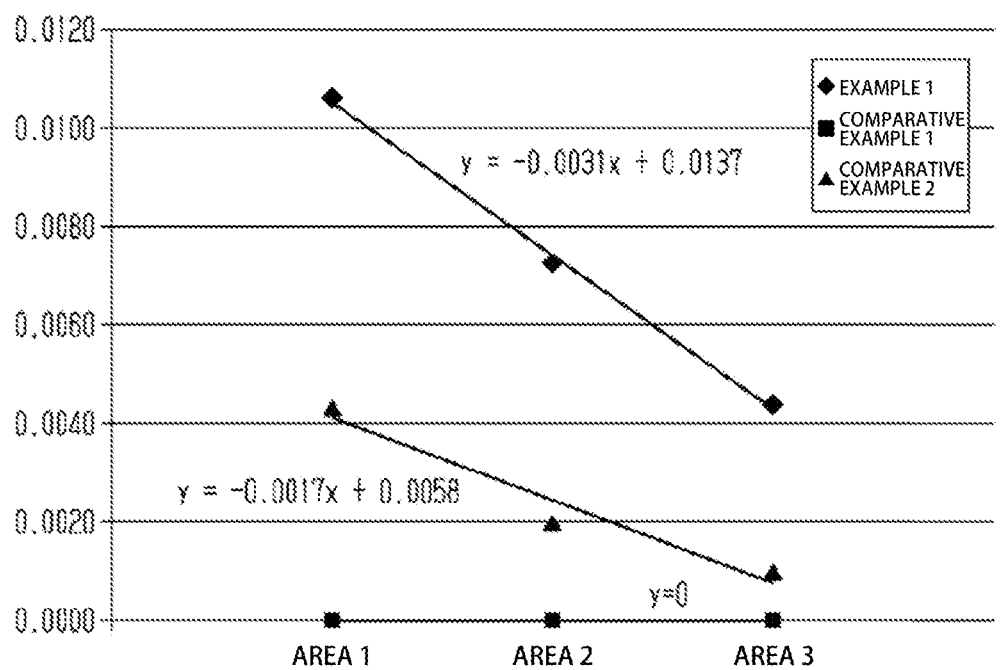
FIG. 4 is a graph showing a relationship between a first standard value and each area in Example and Comparative Examples.

With reference to FIG. 3, a configuration of the polymer electrolyte fuel cell having the membrane electrode assembly 10 will be described. The configuration described below is one example of a polymer electrolyte fuel cell. Additionally, FIG. 3 illustrates a configuration of a single cell provided in the polymer electrolyte fuel cell. The polymer electrolyte fuel cell may include a plurality of single cells, and the plurality of single cells laminated with each another.

As illustrated in FIG. 3, a polymer electrolyte fuel cell 30 includes the membrane electrode assembly 10, a pair of gas diffusion layers, and a pair of separators. A pair of gas diffusion layers includes a cathode-side gas diffusion layer 31C and an anode-side gas diffusion layer 31A. The pair of separators includes a cathode-side separator 32C and an anode-side separator 32A.

The cathode-side gas diffusion layer 31C is in contact with the cathode-side electrode catalyst layer 12C. The cathode-side electrode catalyst layer 12C and the cathode-side gas diffusion layer 31C form an oxygen electrode (cathode) 30C. The anode-side gas diffusion layer 31A is in contact with the anode-side electrode catalyst layer 12A. The anode-side electrode catalyst layer 12A and the anode-side gas diffusion layer 31A form a fuel electrode (anode) 30A.

In the polymer electrolyte membrane 11, a surface to which the cathode-side electrode catalyst layer 12C is bonded is a cathode surface, and a surface to which the anode-side electrode catalyst layer 12A is bonded is an anode surface. A portion of the cathode surface that is not covered with the cathode-side electrode catalyst layer 12C is an outer peripheral portion. As described above, at the outer peripheral portion, a cathode-side gasket 13C is located. A portion of the anode surface that is not covered with the anode-side electrode catalyst layer 12A is an outer peripheral portion. As described above, an anode-side gasket 13A is located at the outer peripheral portion. The gaskets 13C and 13A prevent leakage of gas from the outer peripheral portions of the surfaces.

A multilayer composed of the membrane electrode assembly 10 and the two gas diffusion layers 31C and 31A is sandwiched between the cathode-side separator 32C and the anode-side separator 32A, in the thickness direction of the polymer electrolyte fuel cell 30. The cathode-side separator 32C faces the cathode-side gas diffusion layer 31C. The anode-side separator 32A faces the anode-side gas diffusion layer 31A.

In the cathode-side separator 32C, a pair of opposing surfaces facing away from each other respectively has a plurality of grooves. Among the pair of surfaces, grooves on a surface facing the cathode-side gas diffusion layer 31C are gas flow paths 32Cg. Among the pair of surfaces, grooves on a surface facing away from the cathode-side gas diffusion layer 31C are cooling water flow paths 32Cw.

In the anode-side separator 32A, a pair of opposing surfaces facing away from each other respectively has a plurality of grooves. Among the pair of surfaces, grooves on a surface facing the anode-side gas diffusion layer 31A are gas flow paths 32Ag. Among the pair of surfaces, grooves on a surface facing away from the anode-side gas diffusion layer 31A are cooling water flow paths 32Aw.

The separators 32C and 32A are formed of a material having conductivity, which is impermeable to gas.

In the polymer electrolyte fuel cell 30, an oxidant is supplied through the gas flow paths 32Cg in the cathode-side separator 32C to the oxygen electrode 30C. Additionally, in the polymer electrolyte fuel cell 30, a fuel is supplied to the fuel electrode 30A through the gas flow paths 32Ag in the anode-side separator 32A. Thus, the polymer electrolyte fuel cell 30 generates power. Note that examples of the oxidant include air and oxygen. Examples of the fuel include fuel gases containing hydrogen and organic fuel.

[Material for Forming Electrode Catalyst Layer]

A material for forming the electrode catalyst layer 12 will be described in further detail below.

The catalyst material 21 may be formed of a platinum group metal or a metal other than a platinum group metal. Examples of a platinum group metal may include platinum, palladium, ruthenium, iridium, rhodium, or osmium. Examples of a metal other than a platinum group metal include iron, lead, copper, chromium, cobalt, nickel, manganese, vanadium, molybdenum, gallium, or aluminum. The catalyst material 21 may be formed of an alloy, an oxide, a multiple oxide, or the like of these metals. The catalyst material 21 is preferably formed of platinum or a platinum alloy. The catalyst material 21 is granular, and preferably has a particle size in the range of 0.5 nm or more and 20 nm or less, and more preferably in the range of 1 nm or more and 5 nm or less. When the particle size of the catalyst material 21 is 0.5 nm or more, stability of the catalyst material 21 is improved. When the particle size of the catalyst material 21 is 20 nm or less, reduction in activity of the catalyst material 21 is prevented.

The conductive carrier 22 may be, for example, carbon particles. The carbon particles are conductive fine particles and are not eroded by the catalyst material 21. The carbon particles preferably have a particle size in the range of 10 nm or more to 1,000 nm or less and more preferably 10 nm or more to 100 nm or less. When the particle size of the carbon particles is 10 nm or more, an electron conductive path is more likely to be formed. When the particle size of the carbon particles is 1,000 nm or less, an increase in resistance due to an increased thickness of the electrode catalyst layer 12, and consequently, reduction in power generation performance is prevented.

The polymer electrolyte 23 may be an ion conductive polymer electrolyte. In order to improve adhesion between the electrode catalyst layer 12 and the polymer electrolyte membrane 11, the polymer electrolyte 23 is preferably the same electrolyte as or similar to the polymer electrolyte membrane 11. The polymer electrolyte 23 may be formed, for example, of a fluorine-based resin or a hydrocarbon-based resin. Examples of the fluorine-based resin include Nafion (registered trademark) (manufactured by DuPont). Examples of the hydrocarbon-based resin include engineering plastics and resins obtained by introducing sulfonate groups into copolymers of engineering plastics. Examples of hydrocarbon-based resins include sulfonated polyether ketones, sulfonated polyether sulfones, sulfonated polyether ether sulfones, sulfonated polysulfides, and sulfonated polyphenylenes.

The polymer electrolytes contained in the polymer electrolyte membrane 11 may be the same electrolyte as or different electrolyte from the polymer electrolytes 23 contained in the electrode catalyst layer 12. However, in consideration of the interface resistance between the polymer electrolyte membrane 11 and the electrode catalyst layer 12, and the rate of dimensional change between the polymer electrolyte membrane 11 and the electrode catalyst layer 12 when humidity changes, the polymer electrolyte membrane 11 and the polymer electrolyte 23 preferably satisfy the following. In other words, the polymer electrolytes contained in the polymer electrolyte membrane 11 are preferably the same electrolyte as or similar electrolyte to the polymer electrolytes 23.

The fibrous material 24 may be formed of electron conductive fibers or proton conductive fibers. Examples of the electron conductive fibers include carbon fibers, carbon nanotubes, carbon nanohorns, and conductive polymer nanofibers. In terms of conductivity and dispersibility, the fibrous material 24 is preferably formed of carbon nanofibers.

Electron conductive fibers having catalytic activity are more preferable in terms of reducing the amount of noble metal catalyst used. In a case where the electrode catalyst layer 12 is used as the electrode catalyst layer 12 constituting an oxygen electrode, the electron conductive fibers having catalytic activity may be a carbon alloy catalyst made of carbon nanofibers. The electron conductive fibers having catalytic activity may be fibers formed of an electrode active material for a fuel electrode. The electrode active material may be a material containing at least one transition metal element selected from the group consisting of Ta, Nb, Ti, and Zr. Examples of the material containing a transition metal element include a partial oxide of a carbonitride of a transition metal element, a conductive oxide of a transition metal element, or a conductive oxynitride of a transition metal element.

The proton conductive fiber is a fiber formed of a polymer electrolyte having proton conductivity. A material for forming the proton conductive fiber may be a fluorine polymer electrolyte, a hydrocarbon polymer electrolyte, or the like. Examples of the fluorine polymer electrolyte include Nafion (registered trademark) manufactured by Du Pont, Flemion (registered trademark) manufactured by Asahi Glass Co. Ltd., Aciplex (registered trademark) manufactured by Asahi Kasei Corporation, or Gore Select (registered trademark) manufactured by Gore. Examples of the hydrocarbon polymer electrolyte include electrolytes such as sulfonated polyether ketones, sulfonated polyether sulfones, sulfonated polyether ether sulfones, sulfonated polysulfides, and sulfonated polyphenylenes.

The fibrous material 24 may be formed of only one of the above-described types of fibers or two or more types of fibers. The electron conductive fibers and the proton conductive fibers may be used together as the fibrous material 24.

The fiber diameter of the fibrous material 24 is preferably 0.1 µm or less. Consequently, strength of the electrode catalyst layer 12 can be improved, and when the electrode catalyst layer 12 is formed, occurrence of cracking in the electrode catalyst layer 12 is prevented. A fiber length of the fibrous material 24 is preferably in the range of 1 µm or more and 200 µm or less. When setting the fiber length in the range of 1 µm or more and 200 µm or less, aggregation of the polymer electrolytes contained in the electrode catalyst layer 12 is prevented, and thus voids can be formed in the electrode catalyst layer 12.

In a case where the fibrous material 24 contains polymer electrolyte fibers, the mass of the polymer electrolyte fiber is preferably 0.1 times or more and 3.0 times or less the mass of carbon particles excluding the catalyst. Thus, conduction of protons during power generation is promoted, and the output of the polymer electrolyte fuel cell can be increased.

[Method of Producing Membrane Electrode Assembly]

A method of producing the membrane electrode assembly 10 will be described below.

The electrode catalyst layer 12 of the membrane electrode assembly 10 can be formed by preparing electrode catalyst layer slurry, applying the electrode catalyst layer slurry to a substrate or the like, and then drying the electrode catalyst layer slurry.

The catalyst layer slurry contains the catalyst material 21, the conductive carrier 22, the polymer electrolyte 23, the fibrous material 24, and a solvent. The solvent is preferably, for example, a solvent in which the polymer electrolyte 23 can be dispersed or a solvent in which the polymer electrolyte 23 can be dissolved. The solvent may be formed of water, alcohols, ketones, ethers, amines, esters, or the like. Examples of the alcohols include methanol, ethanol, 1-propanol, 2-propanol, 1-butanol, 2-butanol, isobutyl alcohol, and tert-butyl alcohol. Examples of the ketones include acetone, methyl ethyl ketone, methyl propyl ketone, methyl butyl ketone, methyl isobutyl ketone, methyl amyl ketone, pentanone, heptanone, cyclohexanone, methylcyclohexanone, acetonyl acetone, diethyl ketone, dipropyl ketone, and diisobutyl ketone. Examples of the ethers include tetrahydrofuran, tetrahydropyran, dioxane, diethylene glycol dimethyl ether, anisole, methoxytoluene, diethyl ether, dipropyl ether, and dibutyl ether. Examples of the amines include isopropylamine, butylamine, isobutylamine, cyclohexylamine, diethylamine, and aniline. Examples of the esters include propyl formate, isobutyl formate, amyl formate, methyl acetate, ethyl acetate, propyl acetate, butyl acetate, isobutyl acetate, pentyl acetate, isopentyl acetate, methyl propionate, ethyl propionate, and butyl propionate.

The solvent may be formed of acetic acid, propionic acid, dimethylformamide, dimethylacetamide, N-methylpyrrolidone, or the like. The solvent may be made of a glycol or glycol ether solvent. Examples of the glycol and glycol ether solvent include ethylene glycol, diethylene glycol, propylene glycol, ethylene glycol monomethylether, ethylene glycol dimethylether, ethylene glycol diethylether, diacetone alcohol, 1-methoxy-2-propanol, and 1-ethoxy-2-propanol.

Examples of the method of applying the catalyst layer slurry include doctor blading, die coating, dipping, screen printing, laminator roll coating, and spraying.

Examples of the method of drying the catalyst layer slurry include hot air drying and IR drying. The drying temperature is in the range of 40° C. or more and 200° C. or less, and preferably in the range of 40° C. or more and 120° C. or less. The drying time is in the range of 0.5 minute or more and 1 hour or less, and preferably in the range of 1 minute or more and 30 minutes or less.

The method of producing the membrane electrode assembly 10 may include forming the electrode catalyst layer 12 directly on the polymer electrolyte membrane 11. The method of forming the electrode catalyst layer 12 directly on the polymer electrolyte membrane 11 is preferable in terms of high adhesion between the polymer electrolyte membrane 11 and the electrode catalyst layer 12 and in avoiding occurrence of crushing of the electrode catalyst layer 12 due to thermocompression bonding during transfer.

EXAMPLES

Example and Comparative Examples will be described with reference to FIGS. 4 to 7.

Example 1

20 g of carbon-supported platinum (TEC10E50E, manufactured by Tanaka Kikinzoku Kogyo K.K.) was placed in a container, water was added to the container, and the carbon-supported platinum and water were mixed. Then, 1-propanol, a polymer electrolyte (Nafion (registered trademark) dispersion liquid, manufactured by Wako Pure Chemical Industries, Ltd.), and 10 g of carbon fibers (VGCF-H, manufactured by Showa Denko K.K.) (VGCF is a registered trademark) were added to the container and stirred. Thus, the catalyst layer slurry in Example 1 was obtained. The catalyst layer slurries were applied to the surfaces of the polymer electrolyte membrane (Nafion 212, manufactured by Dupont) by die coating. The polymer electrolyte membrane and the catalyst layer slurries were dried in a furnace at 80° C. to obtain a membrane electrode assembly in Example 1.

Comparative Example 1

A membrane electrode assembly in Comparative Example 1 was obtained in the same manner as in Example 1, except that catalyst slurry was applied to a transfer substrate using die coating then dried, and was subsequently bonded to the polymer electrolyte membrane by thermocompression bonding at 100° C.

Comparative Example 2

A membrane electrode assembly in Comparative Example 2 was obtained in the same manner as in Example 1, except that catalyst slurry containing no carbon fibers was applied to a transfer substrate using die coating then dried, and was subsequently bonded to the polymer electrolyte membrane by thermocompression bonding at 100° C.

[Measurement of Thickness of Electrode Catalyst Layer]

The thickness of the electrode catalyst layer was measured by using a scanning electron microscope (SEM) to observe a cross section of the electrode catalyst layer.

Specifically, the cross section of the electrode catalyst layer was observed at 1,000-fold magnification using a scanning electron microscope (FE-SEM S-4800, manufactured by Hitachi High-Technologies Corporation). The thickness of the electrode catalyst layer was measured at 30 observation points on the cross section of the electrode catalyst layer. The average thickness at 30 observation points was taken as the thickness of the electrode catalyst layer.

[TOF-SIMS Analysis]

A cross section of one of the electrode catalyst layers of each membrane electrode assembly was analyzed by TOF-SIMS. The electrode catalyst layer was divided into three equal portions in the thickness direction of the electrode catalyst layer, and Area 1, Area 2, and Area 3 were located in this order from the portion in contact with the polymer electrolyte membrane. Each area was analyzed using TOF-SIMS. Note that the analysis was conducted using a time-of-flight secondary ion mass spectrometer (TRIFT-V, manufactured by ULVAC-PHI, INCORPORATED.) and that analysis conditions were set as follows.

[Analysis Conditions]

Primary ion species: $Bi^{3+}$
Acceleration voltage: 30 kV
Electric current: 1.5 nA
Measurement time: 10 minutes (count number: approximately 500 thousand to 600 thousand)
Charge neutralization: none
Mass range: 1 to 1,900 emu
Acquired ions: negative ions

[Measuring Power Generation Performance]

A pair of gas diffusion layers (SIGRACET (registered trademark) (35 BC manufactured by SGL Carbon) were placed outside the pair of catalyst layers provided in each membrane electrode assembly, and power generation performance was evaluated using a JARI standard cell. At this time, the cell temperature was set at 80° C., hydrogen (100% RH) was supplied to the anode, and air (100% RH) was supplied to the cathode.

[Evaluation Result]

[Thickness of Electrode Catalyst Layer]

The thickness of an electrode catalyst layer used for TOF-SIMS analysis was measured among the electrode catalyst layers provided in each electrode catalyst layer. It was found that the thickness of the electrode catalyst layer was 16 μm in Example 1, 14 μm in Comparative Example 1, and 10 μm in Comparative Example 2.

[Peak Intensity]

Each electrode catalyst layer was divided into three equal areas in the thickness direction, and TOF-SIMS analysis was performed on each of the areas. The peak intensity of carbon (m/z12), the peak intensity of $SO_3$ (m/z80), and the peak intensity of $HSO^4$ (m/z97) were obtained. The analysis was performed at three regions in each area, and the average value of the peak intensity obtained at each region was taken as the peak intensity in the area.

A first standard value was calculated by dividing the peak intensity of $SO_3$ (m/z80) by the peak intensity of carbon (m/z12), and also dividing by the total thickness of the electrode catalyst layer. A second standard value was calculated by dividing the peak intensity of $HSO_4$ (m/z97) by the peak intensity of carbon (m/z12) and the total thickness of the electrode catalyst layer. A third standard value was calculated by dividing the peak intensity of $SO_3$ (m/z80) by the peak intensity of carbon (m/z12). A fourth standard value was calculated by dividing the peak intensity of $HSO_4$ (m/z97) by the peak intensity of carbon (m/z12). The first standard value, the second standard value, the third standard value, and the fourth standard value were as indicated in Table 1.

TABLE 1

|  | Standard value | Area 1 | Area 2 | Area 3 |
|---|---|---|---|---|
| Example 1 | First standard value | 0.0106 | 0.0073 | 0.0044 |
|  | Second standard value | 0.0142 | 0.0110 | 0.0075 |
|  | Third standard value | 0.1700 | 0.1167 | 0.0700 |
|  | Fourth standard value | 0.2267 | 0.1767 | 0.1200 |
| Comparative Example 1 | First standard value | 0.0000 | 0.0000 | 0.0000 |
|  | Second standard value | 0.0000 | 0.0000 | 0.0000 |
|  | Third standard value | 0.0000 | 0.0000 | 0.0000 |
|  | Fourth standard value | 0.0000 | 0.0000 | 0.0000 |
| Comparative Example 2 | First standard value | 0.0043 | 0.0020 | 0.0010 |
|  | Second standard value | 0.0073 | 0.0043 | 0.0017 |
|  | Third standard value | 0.0433 | 0.0200 | 0.0100 |
|  | Fourth standard value | 0.0733 | 0.0433 | 0.0167 |

[First Standard Value and Second Standard Value]

Figure 5:
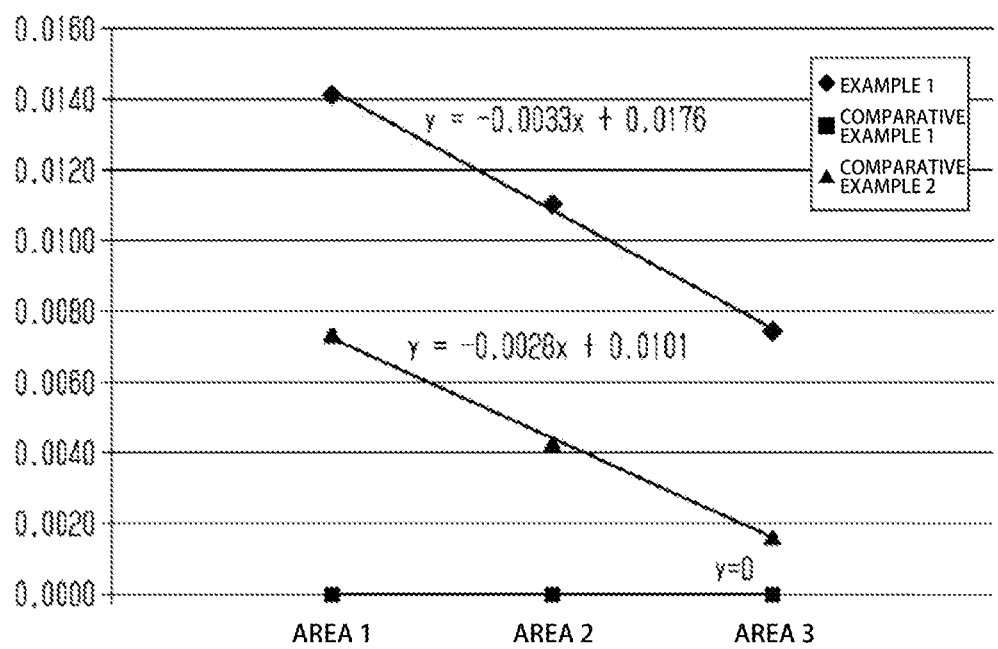
FIG. 5 is a graph showing a relationship between a second standard value and each area in Example and Comparative Examples.
Figure 6:
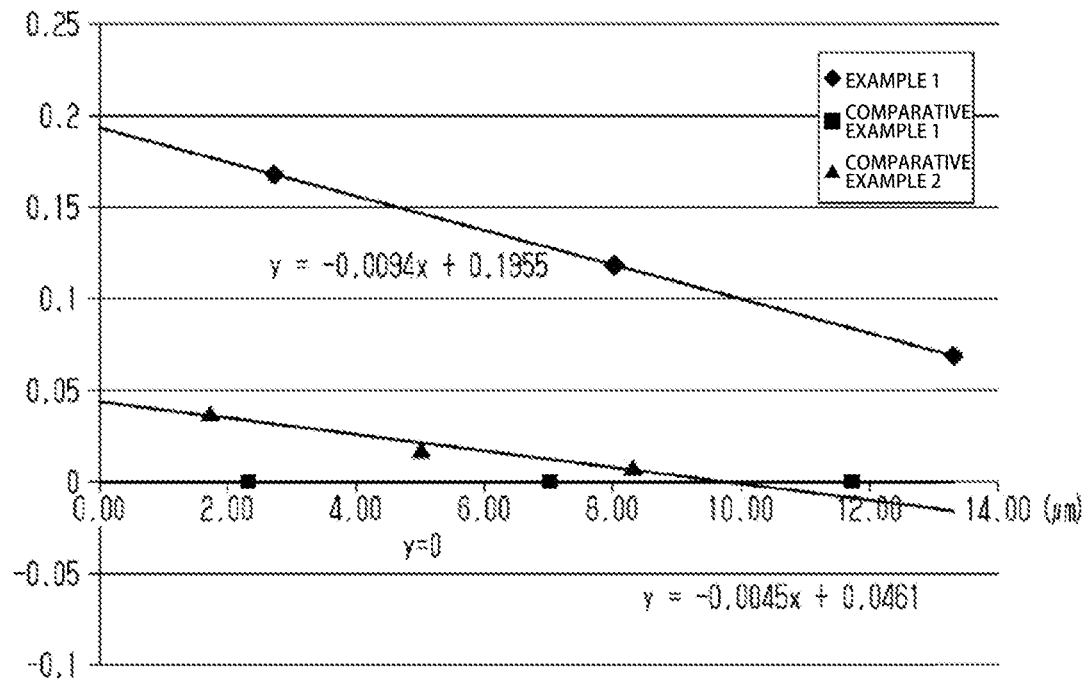
FIG. 6 is a graph showing a relationship between a third standard value and the thickness of the electrode catalyst layer in Example and Comparative Examples.

The first standard values and the second standard values were plotted for each area, and approximate straight lines were calculated. The results are as illustrated in FIG. 5 and FIG. 6. Note that FIG. 5 illustrates approximate straight lines calculated based on the first standard values and that FIG. 6 illustrates approximate straight lines calculated based on the second standard values.

As illustrated in FIG. 5, the approximate straight lines calculated based on the first standard values are as described below.

$$\text{Example 1:} y=-0.0031x+0.0137 \quad \text{Equation (1)}$$

$$\text{Comparative Example 1:} y=0 \quad \text{Equation (2)}$$

$$\text{Comparative Example 2:} y=-0.0017x+0.058 \quad \text{Equation (3)}$$

The calculation results as described above indicate that, in the electrode catalyst layer, the rate of change of the first standard value with respect to the thickness of the electrode catalyst layer from the first surface to the second surface is preferably −0.020 or less.

As illustrated in FIG. 6, the approximate straight lines calculated based on the second standard values are as described below.

$$\text{Example 1: } y=-0.0033x+0.0176 \quad \text{Equation (4)}$$

$$\text{Comparative Example 1: } y=0 \quad \text{Equation (5)}$$

$$\text{Comparative Example 2: } y=-0.0028x+0.0101 \quad \text{Equation (6)}$$

The calculation results as described above indicate that, in the electrode catalyst layer, the rate of change of the second standard value with respect to the thickness of the electrode catalyst layer from the first surface to the second surface is preferably −0.003 or less.

[Third Standard Value and Fourth Standard Value]

Figure 7:
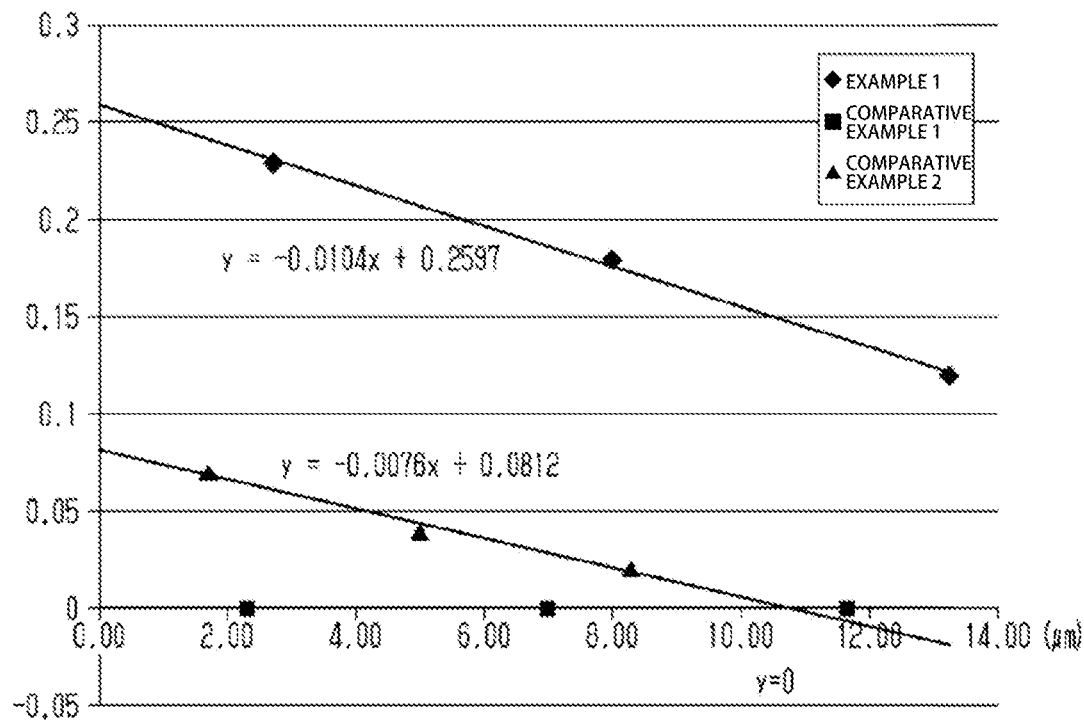
FIG. 7 is a graph indicating a relationship between a fourth standard value and the thickness of the electrode catalyst layer in Example and Comparative Examples.

The third standard values and the fourth standard values were plotted, with the standard value for each area used as a median in the thickness direction of the area, and approximate straight lines were calculated. The results are as illustrated in FIG. 6 and FIG. 7. Note that FIG. 6 illustrates approximate straight lines calculated based on the third standard values and that FIG. 7 illustrates approximate straight lines calculated based on the fourth standard values.

As illustrated in FIG. 6, the approximate straight lines calculated based on the third standard values are as described below.

Example 1: $y=-0.0094x+0.1955$      Equation (7)

Comparative Example 1: $y=0$      Equation (8)

Comparative Example 2: $y=-0.0045x+0.0461$      Equation (9)

The calculation results as described above indicate that, in the electrode catalyst layer, the rate of change of the third standard value with respect to the thickness of the electrode catalyst layer from the first surface to the second surface is preferably −0.0050 or less.

The minimum value of the third standard value was calculated by substituting the thickness of each electrode catalyst layer into each of Equations (7) to (9). It was found that the minimum value was 0.0451 in Example 1, 0 in Comparative Example 1, and 0.0011 in Comparative Example 2. Additionally, it was found that, in Example 1, variation in the third standard value for Area 3 was ±0.01. Thus, in the electrode catalyst layer in Example 1, the third standard value for the second surface is preferably in the range of 0.035 or more and 0.055 or less.

Additionally, a difference between the third standard value for the first surface and the third standard value for the second surface was calculated by subtracting, from an intercept of each of Equations (7) to (9), the minimum value calculated in each equation. It was found that the difference was 0.1504 in Example 1, 0 in Comparative Example 1, and 0.0450 in Comparative Example 2. Thus, in the electrode catalyst layer, the difference between the third standard value for the first surface and the third standard value for the second surface is preferably 0.05 or more.

As illustrated in FIG. 7, the approximate straight lines calculated based on the fourth standard values are as described below.

Example 1: $y=-0.010x+0.2597$      Equation (10)

Comparative Example 1: $y=0$      Equation (11)

Comparative Example 2: $y=-0.0076x+0.0812$      Equation (12)

The calculation results as described above indicate that, in the electrode catalyst layer, the rate of change of the fourth standard value with respect to the thickness of the electrode catalyst layer from the first surface to the second surface is preferably −0.0080 or less.

The minimum value of the fourth standard value was calculated by substituting the thickness of each electrode catalyst layer into each of Equations (10) to (12). It was found that the minimum value was 0.0933 in Example 1, 0 in Comparative Example 1, and 0.0052 in Comparative Example 2. Additionally, it was found that, in Example 1, variation in the fourth standard value for Area 3 was ±0.01. Thus, in the electrode catalyst layer in Example 1, the fourth standard value for the second surface is preferably in the range of 0.083 or more and 0.103 or less.

Additionally, a difference between the fourth standard value for the first surface and the fourth standard value for the second surface was calculated by subtracting, from an intercept of each of Equations (10) to (12), the minimum value calculated in each equation. It was found that the difference was 0.1664 in Example 1, 0 in Comparative Example 1, and 0.0760 in Comparative Example 2. Thus, in the electrode catalyst layer, the difference between the fourth standard value for the first surface and the fourth standard value for the second surface is preferably 0.08 or more.

[Power Generation Performance]

It was found that the membrane electrode assembly in Example 1 had a maximum output density of 863 mW/cm². It was found that the membrane electrode assembly had a maximum output density of 597 mW/cm² in Comparative Example 1, and 633 mW/cm² in Comparative Example 2. According to the membrane electrode assembly in Example 1, it was found that power generation performance of the membrane electrode assemblies in each Comparative Example was improved.

As described above, according to an embodiment of the electrode catalyst layer, the membrane electrode assembly, and the polymer electrolyte fuel cell, the following effects can be obtained.

(1) Each of the standard values decreases from the first surface S1 toward the second surface S2, and thus the amount of the polymer electrolyte 23 decreases from the first surface S1 toward the second surface S2. In other words, the amount of voids in the electrode catalyst layer 12 increases from the first surface toward the second surface. This enables gas diffusivity and drainage from the first surface to the second surface to be improved. Accordingly, the polymer electrolyte fuel cell 30 provided in the electrode catalyst layer 12 can improve power generation performance.

(2) By including each of the third value and fourth standard value in the range described above, the amount of voids on the second surface S2 can be increased to such an extent that sufficient gas diffusivity and sufficient drainage on the second surface S2 can be achieved.

(3) With the difference in third standard value and the difference in fourth standard value included within the above-described ranges, diffusion of gas from the second surface S2 to the first surface S1 is likely to occur, and diffusion of generated water from the first surface S1 to the second surface S2 is likely to occur. This improves both gas diffusivity and drainage of the electrode catalyst layer 12.

(4) The distribution of the polymer electrolyte in the electrode catalyst layer can be determined by using the peak intensity of $SO_3$ (m/z80) and the peak intensity of $HSO_4$ (m/z97) obtained by analysis by TOF-SIMS.

What is claimed is:

1. An electrode catalyst layer configured to be bonded to a polymer electrolyte membrane in a polymer electrolyte fuel cell, the electrode catalyst layer comprising:
   a catalyst material;
   a conductive carbon carrier that supports the catalyst material;
   a polymer electrolyte containing a sulfonate group; and
   a fibrous material, wherein
   the polymer electrolyte is selected from the group consisting of sulfonated polyether ketones, sulfonated polyether sulfones, sulfonated polyether ether sulfones, sulfonated polysulfides, and sulfonated polyphenylenes,
   the electrode catalyst layer includes a first surface configured to be in contact with the polymer electrolyte membrane and a second surface facing away from the first surface,
   a rate of change of a first value of the electrode catalyst layer with respect to a thickness of the electrode catalyst layer is −0.0020 or less in a thickness direction of the electrode catalyst layer from the first surface to the second surface, and wherein the first value is obtained at each of a plurality of positions in the thickness direction of the electrode catalyst layer from the first surface to the second surface from a time of flight secondary ion mass spectrum of the electrode catalyst layer at the respective position by dividing a peak intensity of $SO_3$ ions (m/z80) derived from the polymer electrolyte in the mass spectrum by a peak intensity of carbon (m/z12), which includes carbon from the conductive carbon carrier, in the mass spectrum, and also dividing by the total thickness of the electrode catalyst layer.

2. An electrode catalyst layer configured to be bonded to a polymer electrolyte membrane in a polymer electrolyte fuel cell, the electrode catalyst layer comprising:
   a catalyst material;
   a conductive carbon carrier that supports the catalyst material;
   a polymer electrolyte containing a sulfonate group; and
   a fibrous material, wherein
   the polymer electrolyte is selected from the group consisting of sulfonated polyether ketones, sulfonated polyether sulfones, sulfonated polyether ether sulfones, sulfonated polysulfides, and sulfonated polyphenylenes,
   the electrode catalyst layer includes a first surface configured to be in contact with the polymer electrolyte membrane and a second surface facing away from the first surface,
   a rate of change of a second value of the electrode catalyst layer with respect to a thickness of the electrode catalyst layer is −0.0030 or less in a thickness direction of the electrode catalyst layer from the first surface to the second surface, and wherein the second value is obtained at each of a plurality of positions in the thickness direction of the electrode catalyst layer from the first surface to the second surface from a time of flight secondary ion mass spectrum of the electrode catalyst layer at the respective position by dividing a peak intensity of $HSO_4$ ions (m/z80) derived from the polymer electrolyte in the mass spectrum by a peak intensity of carbon (m/z12), which includes carbon from the conductive carbon carrier, in the mass spectrum, and also dividing by the total thickness of the electrode catalyst layer.

3. An electrode catalyst layer configured to be bonded to a polymer electrolyte membrane in a polymer electrolyte fuel cell, the electrode catalyst layer comprising:
   a catalyst material;
   a conductive carbon carrier that supports the catalyst material;
   a polymer electrolyte containing a sulfonate group; and
   a fibrous material, wherein
   the polymer electrolyte is selected from the group consisting of sulfonated polyether ketones, sulfonated polyether sulfones, sulfonated polyether ether sulfones, sulfonated polysulfides, and sulfonated polyphenylenes,
   the electrode catalyst layer includes a first surface configured to be in contact with the polymer electrolyte membrane and a second surface facing away from the first surface,
   a rate of change of a third value of the electrode catalyst layer with respect to a thickness of the electrode catalyst layer is −0.0050 or less in a thickness direction of the electrode catalyst layer from the first surface to the second surface, and wherein the third value is obtained at each of a plurality of positions in the thickness direction of the electrode catalyst layer from the first surface to the second surface from a time of flight secondary ion mass spectrum of the electrode catalyst layer at the respective position by dividing a peak intensity of $SO_3$ ions (m/z80) derived from the polymer electrolyte in the mass spectrum by a peak intensity of carbon (m/z12), which includes carbon from the conductive carbon carrier, in the mass spectrum.

4. The electrode catalyst layer of claim 3, wherein the third value for the second surface is in a range of 0.035 or more and 0.055 or less.

5. The electrode catalyst layer of claim 3, wherein a difference between the third value for the first surface and the third value for the second surface is 0.05 or more.

6. An electrode catalyst layer configured to be bonded to a polymer electrolyte membrane in a polymer electrolyte fuel cell, the electrode catalyst layer comprising:
   a catalyst material;
   a conductive carbon carrier that supports the catalyst material;
   a polymer electrolyte containing a sulfonate group; and
   a fibrous material, wherein
   the polymer electrolyte is selected from the group consisting of sulfonated polyether ketones, sulfonated polyether sulfones, sulfonated polyether ether sulfones, sulfonated polysulfides, and sulfonated polyphenylenes,
   the electrode catalyst layer includes a first surface configured to be in contact with the polymer electrolyte membrane and a second surface facing away from the first surface,
   a rate of change of a fourth value of the electrode catalyst layer with respect to a thickness of the electrode catalyst layer is −0.0080 or less in a thickness direction of the electrode catalyst layer from the first surface to the second surface, and wherein the fourth value is obtained at each of a plurality of positions in the thickness direction of the electrode catalyst layer from the first surface to the second surface from a time of flight secondary ion mass spectrum of the electrode catalyst layer at the respective position by dividing a peak intensity of $HSO_4$ ions (m/z80) derived from the polymer electrolyte in the mass spectrum by a peak intensity of carbon (m/z12), which includes carbon from the conductive carbon carrier, in the mass spectrum.

7. The electrode catalyst layer of claim 6, wherein the fourth value for the second surface is in a range of 0.083 or more and 0.103 or less.

8. The electrode catalyst layer of claim 6, wherein a difference between the fourth value for the first surface and the fourth value for the second surface is 0.08 or more.

9. A membrane electrode assembly comprising:
   a polymer electrolyte membrane having two surfaces facing away from each other; and
   the electrode catalyst layer of claim 1, wherein
   the electrode catalyst layer is bonded to at least one of the two surfaces.

10. A polymer electrolyte fuel cell comprising the membrane electrode assembly of claim 9.

* * * * *